(12) United States Patent
Sugimoto et al.

(10) Patent No.: US 11,391,189 B2
(45) Date of Patent: Jul. 19, 2022

(54) LINK COMPONENT WITH OIL HOLE

(71) Applicant: NISSAN MOTOR CO., LTD., Yokohama (JP)

(72) Inventors: Tsuyoshi Sugimoto, Kanagawa (JP); Takahiro Hamada, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 16/965,400

(22) PCT Filed: Jan. 31, 2018

(86) PCT No.: PCT/JP2018/003092
§ 371 (c)(1),
(2) Date: Jul. 28, 2020

(87) PCT Pub. No.: WO2019/150465
PCT Pub. Date: Aug. 8, 2019

(65) Prior Publication Data
US 2021/0071553 A1 Mar. 11, 2021

(51) Int. Cl.
*F01M 11/02* (2006.01)
*C23C 8/22* (2006.01)
(Continued)

(52) U.S. Cl.
CPC .............. *F01M 11/02* (2013.01); *C23C 8/22* (2013.01); *C23C 8/80* (2013.01); *F02B 75/04* (2013.01);
(Continued)

(58) Field of Classification Search
CPC .. F01M 11/02; C23C 8/22; C23C 8/80; C23C 8/46; F02B 75/04; F02B 75/35; F16C 7/023; F16C 2202/02; F16C 2202/04; F16C 2204/64; F16C 2204/66; F16C 2223/12; F16C 2360/22
See application file for complete search history.

(56) References Cited

U.S. PATENT DOCUMENTS 2,815,680 A * 12/1957 Morris .................... F16H 21/34
74/580
5,724,860 A * 3/1998 Sekiguchi ............... F01L 1/047
123/90.6
(Continued)

FOREIGN PATENT DOCUMENTS

JP 60-1423 A 1/1985
JP 2003-328078 A 11/2003
(Continued)

*Primary Examiner* — Syed O Hasan
(74) *Attorney, Agent, or Firm* — Foley & Lardner LLP

(57) ABSTRACT

A link component (150) with an oil hole (150E) is attached to a crankshaft (106) of an internal combustion engine (E), and the oil hole (150E) allows communication from an outside to the crankshaft (106) side. The oil hole (150E) has an inclined surface (150F) along an opening rim on the crankshaft (106) side. A surface other than the oil hole (150E) has a carbon concentration of 0.5 wt % or more. The inclined surface (150F) has a carbon concentration within a range of 0.7 wt % or more and 0.9 wt % or less. Production cost is suppressed, and at the same time, damage is prevented by increasing resistance of the oil-hole part on which stress is liable to concentrate.

11 Claims, 5 Drawing Sheets

(51) Int. Cl.
*C23C 8/80* (2006.01)
*F02B 75/04* (2006.01)
*F02B 75/32* (2006.01)
*F16C 7/02* (2006.01)

(52) U.S. Cl.
CPC .............. *F02B 75/32* (2013.01); *F16C 7/023* (2013.01); *F16C 2202/02* (2013.01); *F16C 2202/04* (2013.01); *F16C 2204/64* (2013.01); *F16C 2204/66* (2013.01); *F16C 2223/12* (2013.01); *F16C 2360/22* (2013.01)

(56) References Cited

U.S. PATENT DOCUMENTS

| | | | |
|---|---|---|---|
| 6,655,026 B1 * | 12/2003 | Iida | C23C 8/80 72/340 |
| 2004/0047757 A1 | 3/2004 | Takayama | |
| 2007/0151634 A1 * | 7/2007 | Fujita | C22C 38/02 148/318 |
| 2009/0288643 A1 * | 11/2009 | Kono | F02B 75/048 123/48 B |

FOREIGN PATENT DOCUMENTS

| | | |
|---|---|---|
| JP | 2004-162895 A | 6/2004 |
| JP | 2006-349055 A | 12/2006 |
| JP | 2007-327112 A | 12/2007 |
| JP | 2016-191151 A | 11/2016 |

* cited by examiner

LINK COMPONENT WITH OIL HOLE

TECHNICAL FIELD

The present invention relates to a link component that is attached to a crankshaft of an internal combustion engine. More specifically, the present invention relates to a link component with an oil hole that allows communication from an outside to the crankshaft side.

BACKGROUND ART

As an example of the link component as described above, there may be mentioned an intermediate link to be used in a double-action link mechanism of a variable-compression-ratio engine. For the sake of convenience in being attached to a crankpin of the crankshaft, this intermediate link is split into a pair of link members at a part through which the crankpin is inserted. The link members each have the oil hole that allows the communication from the outside to the crankshaft side, that is, to the crankpin side. Then, the intermediate link is attached to the crankpin by coupling, with the bolts, the link members joined to each other with the crankpin sandwiched therebetween. In addition, other links of the double-action link mechanism are coupled respectively to the link members.

While the engine is running, the intermediate link is subjected to repetitive bending input. Thus, in the production, a material having high bending-fatigue strength and a reinforcing process are needed. As disclosed in Patent Literature 1, a link securing high hardness and high toughness has been provided. According to the disclosure of Patent Literature 1, a high-hardness and high-toughness steel material having a hardness of HRC 50 or more is provided by properly adding Si, Al, Cr, Mo, V, W, Ni, and Co and by high-temperature tempering at 600° C. or more. The carburizing and the quenching refer to a technology for increasing bending-fatigue resistance of steel components by forming their surfaces into dense martensitic structures, specifically, by subjecting these surfaces to carbon impregnation and rapid cooling.

CITATION LIST

Patent Document

Patent Document 1: Japanese Patent Application Laid-open No. 2003-328078

SUMMARY OF INVENTION

Technical Problem

However, when the link members of the intermediate link as described above are subjected to the bending input, bending stress concentrates particularly on parts where the oil holes are provided. Thus, these parts may be starting points of damage. However, heat treatment quality of the oil-hole parts and heat treatment quality of other parts to be obtained by general carburizing and quenching are equivalent to each other. Thus, it is difficult for the oil-hole parts to withstand high bending stress. As a countermeasure, it is conceivable to adopt the method disclosed in Patent Literature 1. However, the technology disclosed in Patent Literature 1 has a problem of high production cost due to the high tempering temperature and the variety of additive elements for the material.

The present invention has been made in view of the circumstances in the related art as described above, and an object thereof is to provide a link component with an oil hole, which is attached to a crankshaft of an internal combustion engine, which can suppress production cost, and at the same time, can prevent damage by increasing resistance of oil-hole parts on which stress is liable to concentrate.

Solution to Problem

The link component with the oil hole according to the present invention is attached to a crankshaft of an internal combustion engine, and the oil hole allows communication from an outside to the crankshaft side. In addition, the oil hole of the link component has an inclined surface along an opening rim on the crankshaft side. A surface other than the oil hole has a carbon concentration of 0.5 wt % or more. The inclined surface has a carbon concentration within a range of 0.7 wt % or more and 0.9 wt % or less.

Advantageous Effects of Invention

In the link component with the oil hole according to the present invention, the inclined surface is provided along the opening rim on the crankshaft side of the oil hole, and the carbon concentration of this inclined surface is set to be higher than that of the other part. With this, initial crack strength is increased, and the damage to the oil-hole part on which the stress is liable to concentrate is prevented.

At this time, in the link component, the carbon concentration of the surfaces other than the oil hole is set to 0.5 wt % or more, and a lower limit of the carbon concentration of the inclined surface is set to 0.7 wt %. With this, material yield strength is secured. In addition, in the link component, an tipper limit of the carbon concentration of the inclined surface is set to 0.9 wt %. With this, formation of cementite that may cause the damage is suppressed. As a result, the damage that may occur from the cementite and need not be taken into consideration in normal cases is prevented. This link component does not need the variety of additive elements and the high-temperature tempering.

In this way, the link component with the oil hole according to the present invention can suppress the production cost, and at the same time, can prevent the damage by increasing the resistance of the oil-hole parts on which stress is liable to concentrate.

DESCRIPTION OF THE EMBODIMENTS

First Embodiment

Figure 1:
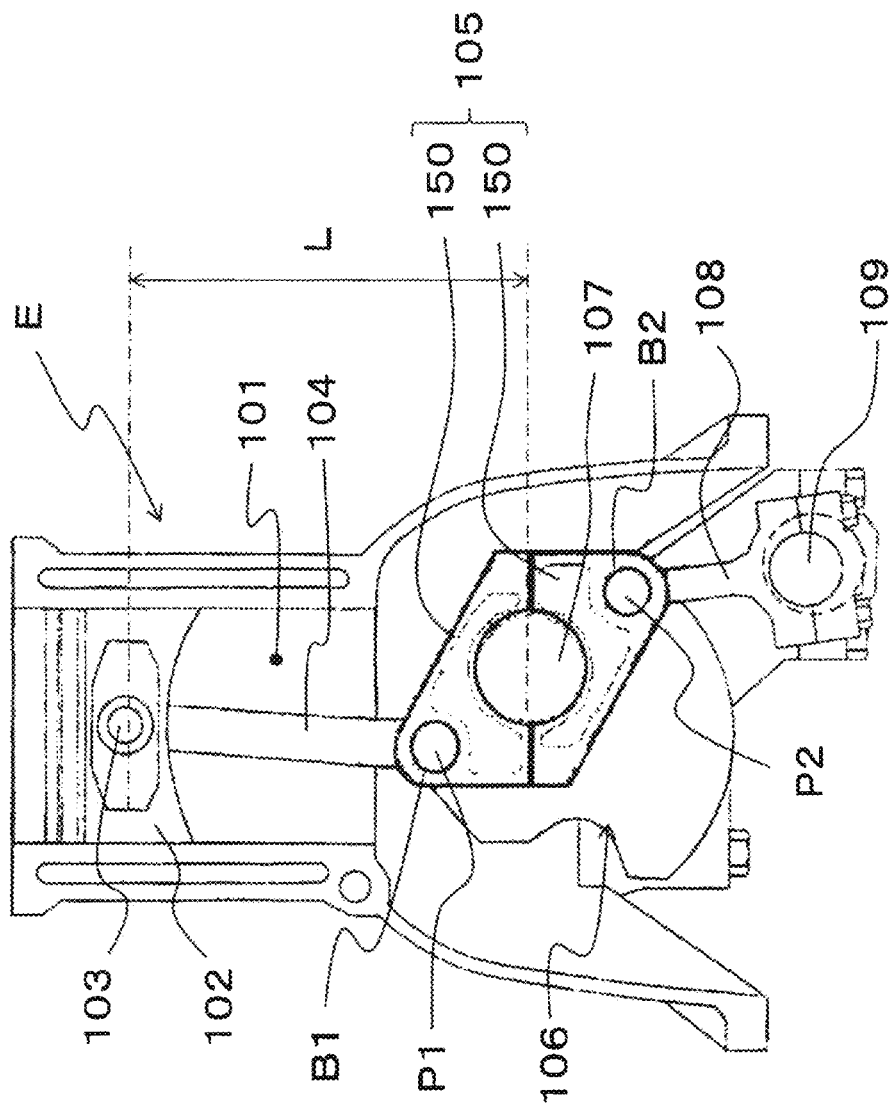
FIG. 1 is an explanatory cross-sectional view of a variable-compression-ratio engine to which a link component according to a first embodiment of the present invention is applicable.

FIG. 1 is an explanatory cross-sectional view of a variable-compression-ratio engine to which a link component with an oil hole according to the present invention (hereinafter, simply referred to as "link component") is applicable. A variable-compression-ratio engine E illustrated in FIG. 1 includes a piston 102 which is reciprocated in a cylinder 101 and to which an upper end portion of an upper link 104 is coupled via a piston pin 103. The upper link 104 includes a lower end portion to which one end portion of an intermediate link 105 is coupled via a first link pin P1 and a first bushing B.

The intermediate link 105 has a center through which a crankpin 107 of a crankshaft 106 is inserted, and includes another end portion to which an upper end portion of a lower link 108 is coupled via a second link pin P2 and a second bushing B2. The lower link 108 includes a lower end portion to which a control rod 109 is coupled, and the lower link 108 is connected to an actuator (not shown) that reciprocates this control rod 109 in parallel.

The variable-compression-ratio engine E configured as described above causes the lower link 108 to rotate about the crankpin 107 by moving the control rod 109. In this way, the variable-compression-ratio engine E varies a connecting-rod length L being a length from the crankpin 107 to the piston pin 103 to vary strokes of the piston 102, thereby varying a compression ratio.

Figure 2:
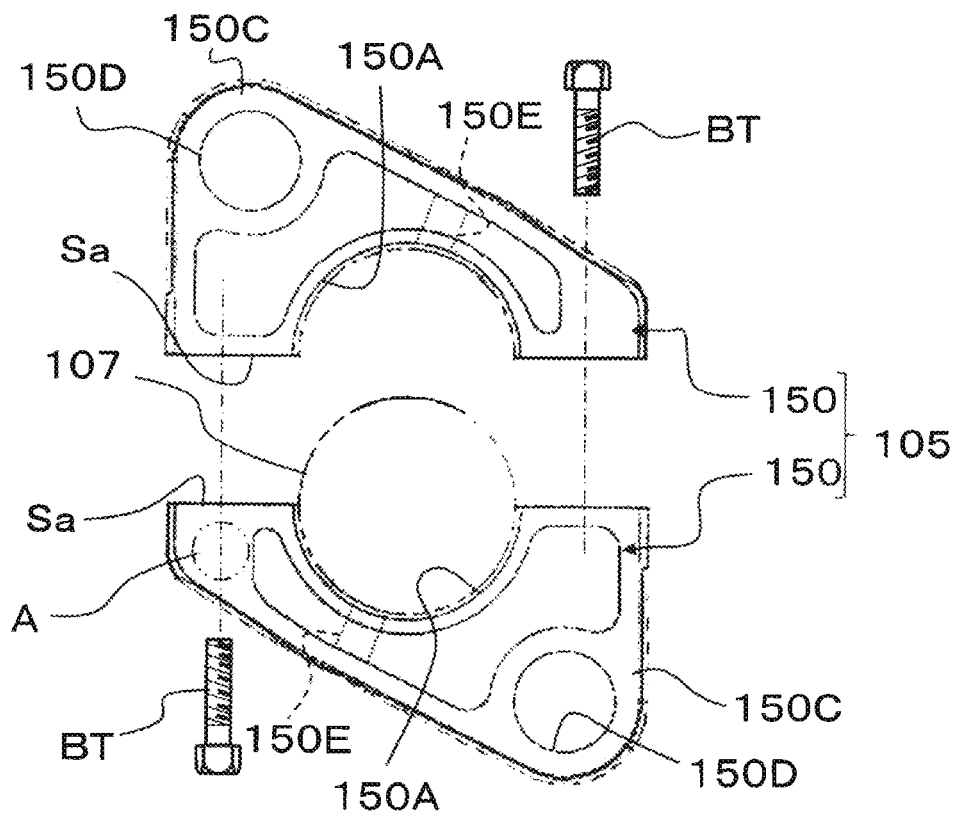
FIG. 2 is an explanatory side view in which an intermediate link being the link component is disassembled.

Note that, as illustrated in FIG. 2, for the sake of convenience in being attached to the crankpin 107 of the crankshaft 106, the intermediate link 105 is split into a pair of link members 150 and 150 at the part through which the crankpin 107 is inserted. The two link members 150 and 150 are components having the same structure, specifically, having a rotationally symmetrical shape about the crankpin 107 in the side view of FIG. 2.

In addition, the lower end portion of the upper link 104 is coupled to be rotatable to one of the link members 150 of the intermediate link 105 via the first link pin P1 and the first bushing B1. Further, the upper end portion of the lower link 108 is coupled to another one of the link members 150 via the second link pin P2 and the second bushing B2.

Figure 3:
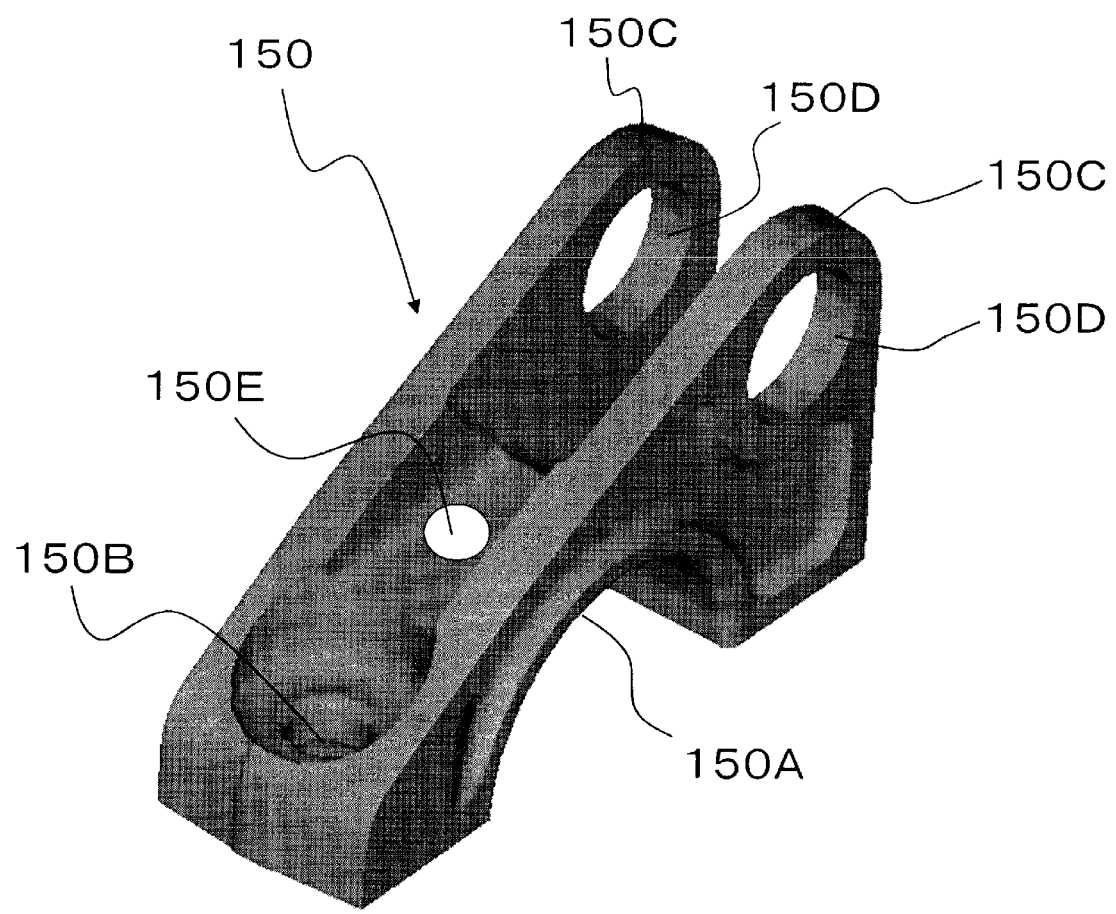
FIG. 3 is a perspective view of a link member being the link component.

As illustrated in FIG. 3, the link members 150 each include a semicircular attachment portion 150A corresponding to half of a circumference of the crankpin 107 on a joint surface Sa side (lower side in FIG. 3) with respect to a counterpart side.

Further, on an opposite side of the joint surface Sa (upper side in FIG. 3), the link members 150 each have, on its one side (left-hand side in FIG. 3), a bolt insertion hole 150B having an axis orthogonal to the joint surface Sa, and have, on another side, a pair of ribs 150C and 150C. The ribs 150C each have an attachment hole 150D for allowing the first link pin P1 and the first bushing B1 (or second link pin P2 and second bushing B2) to be attached thereto.

Still further, the link members 150 each have an oil hole 150E that allows communication from an outside to the crankshaft side. The oil hole 150E allows communication from a position between the bolt insertion hole 150B and the ribs 150C on the outside to the attachment portion 150A for the crankpin 107. This oil hole 150E allows lubricating oil to be continuously supplied from the outside of the link member 150 to the crankpin 107 side.

The link members 150 and 150 of the intermediate link 105 are joined to each other with the crankpin 107 sandwiched therebetween, and then, as illustrated in FIG. 2, are coupled to each other with bolts BT screwed into a counterpart of the link members 150 through one of the link members 150. In this way, the intermediate link 105 is attached to the crankpin 107.

The link component with the oil hole according to the present invention is suited to the link member 150 of the intermediate link 150. The link members 150 as the link components are attached to the crankshaft 106 of the variable-compression-ratio engine (internal combustion engine) E, and have the oil hole 150E that allows the communication from the outside to the crankshaft 106 side. Note that, as a matter of course, the crankpin 107, to which the link members 150 are directly attached, is a part of the crankshaft 106.

The intermediate link 105 moves to rotate the crankpin 107 about a central axis of the crankshaft 106 in conjunction with the reciprocation of the piston 102 while the variable-compression-ratio engine E is running, and hence is subjected to repetitive bending input. At this time, in the link members 150 of the intermediate link 150, bending stress is liable to concentrate on a point at which the oil hole 150E is provided.

Figure 4:
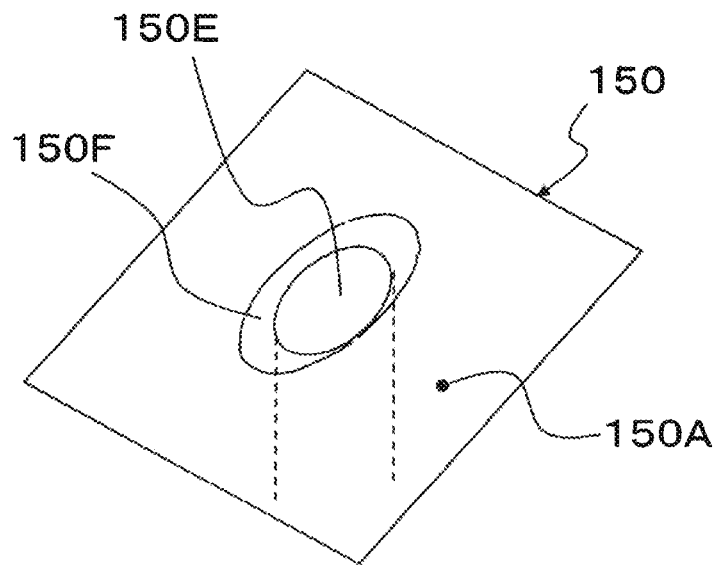
FIG. 4 is a perspective view of an oil-hole part of the link member.

As a countermeasure, in the link members 150, as illustrated in FIG. 4, the oil hole 150E has a chamfered inclined surface 150F along an opening rim on the crankshaft 106 side, that is, directly, on the crankpin 107 side. In addition, in the link members 150, a surface other than the oil hole 150E has a carbon concentration of 0.5 wt % or more, and the inclined surface 150F has a carbon concentration within a range of 0.7 wt % or more and 0.9 wt % or less.

In the production of the link members 150, neither a variety of additive elements nor high-temperature tempering is needed unlike the related art. A desired carbon concentration and a desired hardness of the link members 150 can be controlled by controlling an angle and an area of the inclined surface 150 and by carburizing and quenching.

In the link members 150, the inclined surface 150F is provided along the opening rim on the crankshaft 106 side of the oil hole 105E, and the carbon concentration of this inclined surface 150F is set to be higher than those of the other parts. With this, initial crack strength is increased, and damage to the oil-hole part on which the stress is liable to concentrate is prevented.

Specifically, in the link members 150, the carbon concentration of the surface other than the oil hole 150E is set to 0.5 wt % or more, and a lower limit of the carbon concentration of the inclined surface 150F is set to 0.7 wt %. With this, material yield strength is secured. In addition, in the link members 150, an upper limit of the carbon concentration of the inclined surface 150F is set to 0.9 wt %. With this, formation of cementite that may cause the damage is suppressed. As a result, the damage that may occur from the cementite and need not be taken into consideration in normal cases is prevented.

In other words, if the opening rim of the oil hole 150E of the link members 150 has a corner instead of the inclined surface, in the carburizing, the carburizing progresses in an opening surface and an inner surface of the oil hole 150E. Thus, a carburizing concentration significantly increases at the corner. As a result, the cementite is liable to be formed in a structure of the opening rim of the oil hole 150E.

As a countermeasure, in the link members 150, the inclined surface 150F is provided along the opening rim of the oil hole 150E so as to suppress the excessive increase in carburizing concentration along the opening rim, and in addition, the upper limit of the carbon concentration of the inclined surface 150F is set to 0.9 wt %. With this, in the link members 150, the formation of the cementite along the opening rim of the oil hole 150E is suppressed, and the damage that may occur from the cementite is prevented.

In this way, the link members 150 can suppress production cost, and at the same time, can prevent the damage by increasing resistance of the part corresponding to the oil hole 150F on which the stress is liable to concentrate. Note that, the inclined surface 150F may be provided around the opening rims on both sides. However, in the link members 150, since the crankshaft side corresponds to a side on which the bending load is input, the inclined surface 150F is provided on the crankshaft side, and its carbon concentration is defined.

Figure 5:
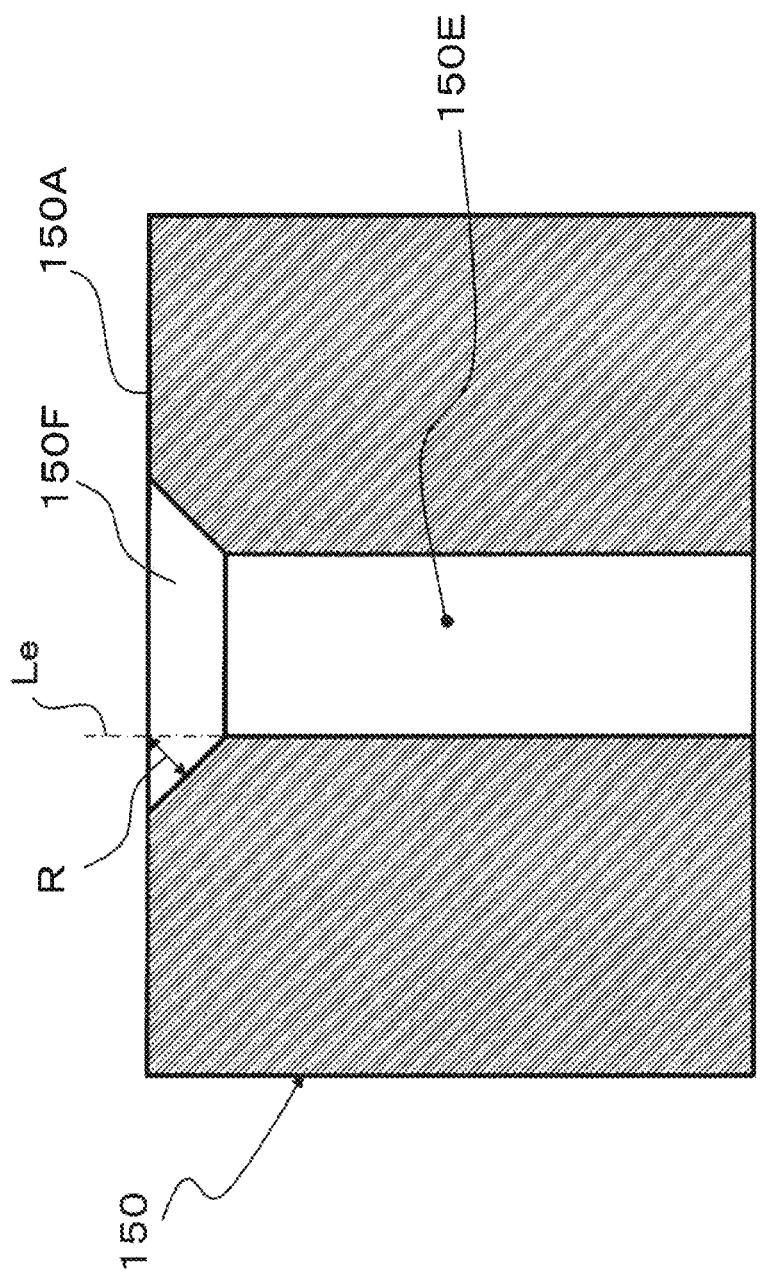
FIG. 5 is a cross-sectional view of the oil-hole part of the link member.

Note that, in the cross-section illustrated in FIG. 5, with regard to the inclined surface 150F of the link members 150, a length R from an intersection between an extension line Le of an inner surface of the oil hole 150E and a surface of the member to the inclined surface 150F preferably falls within a range from 0.05 mm to 0.2 mm. This length R can be also regarded as a chamfered amount. Note that, the inclined surface 150F illustrated as an example in FIG. 5 has an inclination angle of 45 degrees with respect to an axial line of the oil hole 150E.

In other words, an area of the inclined surface 150F is determined by setting the length R (chamfered amount), and hence a value of its lower limit is set to 0.05 mm such that the above-described function to suppress the formation of the cementite is reliably implemented. In addition, by setting a value of an upper limit of the length R of the inclined surface 150F to 0.2 mm, the carbon concentration higher than those of other parts can be reliably obtained.

Further, as a more preferred embodiment of the link members 150, the inclined surface 150F may have an arithmetic surface roughness Ra of 1.7 μm or less, and may have a maximum height Ry of 9.8 μm or less.

By setting upper limits of the surface roughness and the maximum height of the inclined surface 150F of the link members 150, formation of initial cracks in the inclined surface 150F can be prevented. In other words, when the arithmetic surface roughness Ra exceeds 1.7 μm, the damage may occur from recess portions of protrusions and recesses. Meanwhile, when there are minute protrusion portions having the maximum height exceeding Ry of 9.8 μm, as in the above description of the opening rim of the oil hole 150E, the carburizing concentration may concentrate on these protrusion portions in the carburizing to form the cementite.

As a countermeasure, in the link members 150, the upper limits of the surface roughness and the maximum height of the inclined surface 150F around the oil hole 150E are defined. With this, the surface can be smoothed to prevent the damage that may occur from the recess portions, and to prevent microscopic concentration of the carbon concentration. As a result, the damage that may occur from the cementite can be prevented.

Still further, as another more-preferred embodiment of the link members 150, the inclined surface 150F may have a Rockwell hardness of 58 HRC or more.

In other words, with regard to the inclined surface 150F, not only by setting the carbon concentration as described above but also by setting the surface hardness, an amount of retained austenite in the surface after the carburizing and the quenching can be set. Thus, by setting the hardness, the amount of the retained austenite, and the carbon content of the inclined surface 150F, the link members 150 are increased in temper-softening resistance, toughness, and bending-fatigue strength around the oil hole 150E.

Yet further, as still another more-preferred embodiment of the link members 150, the inclined surface 150F may have a surface on which an intergranular oxidized layer having a thickness of 5 μm or less is formed. In the production of such a link member 150, a production method including a step of performing the carburizing is preferably adopted, and the carburizing is preferably vacuum carburizing.

Generally, when the intergranular oxidized layer is formed by the carburizing, this intergranular oxidized layer may be a starting point of the damage. In the link members 150, in order that the formation of the initial cracks in the inclined surface 150F is prevented, the intergranular oxidized layer is preferably not formed at least on the inclined surface 150F.

As a countermeasure, in the production of the link members 150, the vacuum carburizing is performed as the carburizing. With this, at least the formation of the intergranular oxidized layer on the inclined surface 150F can be suppressed, and at the same time, the carbon concentration, the amount of the retained austenite, and the hardness can be controlled and limited. In this way, the link members 150 have a carbon concentration difference, specifically, the carbon concentration of the inclined surface 150F is higher than that of the surface therearound.

EXAMPLES

In this context, by the processing procedure described below, link members of Examples 1 to 12 and Comparative Examples 1 to 3 were produced. SCr420H (JIS) was used as a material for the link members. Except Comparative Example 3, the chamfered amount (length R illustrated in FIG. 5) of the inclined surface was set to 0.1 mm. In Comparative Example 3, the chamfered surface is not formed. In addition, tool marks formed at the time of forming the oil holes were removed by polishing. These tool marks may be starting points of the damage.

In Examples 1 to 11, the vacuum carburizing was performed. In this vacuum carburizing, link members made of steel were placed in a furnace, the inside of the furnace was evacuated, and the link members were heated at 1,050° C. Then, an acetylene gas was introduced into the furnace for 30 seconds. Next, a nitrogen gas was introduced for 4 minutes to carburize the link members. This sequence as one pulse was repeated several times. After that, before quenching, the link members were held at a temperature lower than the carburizing temperature, and then was quenched (cooled) with the nitrogen gas. During the quenching, the nitrogen gas was supplied at a pressure of 1.0 MPa.

In Example 12, gas carburizing was performed. In this gas carburizing, the link members made of steel were placed in the furnace, a butane gas was introduced into the furnace, a carbon potential (CP) in the furnace was set to 0.6, and the link members were carburized at 930° C. for 2.5 hours.

Further, in Examples 1 to 11 and Comparative Examples 1 to 3, a carburizing pulse length (ratio of the nitrogen gas to the acetylene gas) was set to different lengths. This carburizing pulse length is a condition for determining the carbon concentration of the inclined surfaces. Still further, in Examples 1 to 12 and Comparative Examples 1 to 3, the link members were carburized with a different number of the pulses. As the number of the pulses becomes larger, carbon reaches deeper and the carbon concentration becomes higher.

Yet further, in Examples 1 to 12 and Comparative Examples 1 to 3, a distance from a most upstream side of the nitrogen gas to a hardness measurement portion at the time of the quenching was adjusted. This distance is a condition for determining the surface hardness. As the distance becomes longer, a cooling rate becomes lower and the hardness measurement portion is softened. Note that, the hardness measurement portion of the link members includes the inclined surface and the other parts. At this time, the other parts are evaluated preferably at parts where volume per unit is high, and hence a lateral surface portion around the bolt insertion hole (for example, portion A illustrated in FIG. 2) was used as the hardness measurement portion.

Yet further, in Examples 1 to 12 and Comparative Examples 1 and 2, the inclined surfaces were polished until values of the arithmetic mean roughness Ra and the maximum height Ry shown in Table 1 were obtained.

In Examples 1 to 12 and Comparative Examples 1 to 3, the carbon concentration of the parts other than the inclined surfaces, the carbon concentration of the inclined surfaces, a Rockwell hardness HRC of the surface of the inclined surfaces, the arithmetic mean roughness Ra of the surface of the inclined surfaces, the maximum height Ry of the inclined surfaces, and whether or not the intergranular oxidized layer was formed and its thickness were measured.

In the measurement of the carbon concentration, the carbon concentration of the surface of the parts other than the inclined surfaces, and the carbon concentration of the surface of the inclined surfaces were measured with the electron probe micro analyzer (EPMA).

In the measurement of the Rockwell hardness, IRC hardness (according to JIS Z2245) of the surface of the inclined surfaces was calculated as a 5-point average with a Rockwell hardness meter.

In the measurement of the arithmetic mean roughness Ra and the maximum height Ry, an arithmetic mean roughness Ra and a maximum height Ry (according to JIS B0601-1994) of the surface of the inclined surfaces was calculated with a stylus-type roughness meter.

In the measurement as to whether or not the intergranular oxidized layer was formed, whether or not the intergranular oxidized layer was formed was checked by analyzing constituent elements in a cross-section of the inclined surfaces with the electron probe micro analyzer. In addition, in the measurement of the thickness of the intergranular oxidized layer, the thickness of the intergranular oxidized layer was measured by observing its cross-section under a scanning electron microscope.

Yet further, in Examples 1 to 12 and Comparative Examples 1 to 3, a fatigue test was conducted at a stress ratio of zero. Specifically, the pair of link members coupled to each other with the bolts were tested at the stress ratio of zero under a load of 48 kN by using a computer-controlled Instron 8501 hydraulic testing machine at room temperature in an atmospheric environment. A repetition frequency was set to 10 Hz, and the number of cycles was set to 10 million times, and a state of the link component after the test was checked.

Table 1 shows the processing conditions and the measurement results in Examples 1 to 12 and Comparative Examples 1 to 3.

TABLE 1

|  | Inclined Surface (Chamfered) | Carbon Concentration of Surface of Flat Portion (wt %) | Carbon Concentration of Surface of Oil-Hole Portion (wt %) | Surface Hardness (HRC) | Surface Roughness of Oil-Hole Portion (Ra/μm) | Surface Roughness of Oil-Hole Portion (Ry/μm) |
|---|---|---|---|---|---|---|
| Example 1 | Chamfered | 0.6 | 0.8 | 58 | 1.7 | 9.4 |
| Example 2 | Chamfered | 0.6 | 0.8 | 59 | 1.4 | 9.5 |
| Example 3 | Chamfered | 0.6 | 0.8 | 59 | 1.3 | 9.1 |
| Example 4 | Chamfered | 0.6 | 0.8 | 60 | 1.5 | 8.9 |
| Example 5 | Chamfered | 0.51 | 0.71 | 60 | 1.3 | 9.1 |
| Example 6 | Chamfered | 0.7 | 0.9 | 60 | 1.4 | 9.4 |
| Example 7 | Chamfered | 0.6 | 0.8 | 59 | 1.5 | 9.1 |
| Example 8 | Chamfered | 0.6 | 0.8 | 61 | 1.71 | 9.2 |
| Example 9 | Chamfered | 0.6 | 0.8 | 56 | 1.8 | 9.3 |
| Example 10 | Chamfered | 0.6 | 0.8 | 60 | 1.5 | 10 |
| Example 11 | Chamfered | 0.6 | 0.8 | 57 | 1.3 | 9.1 |
| Example 12 | Chamfered | 0.6 | 0.8 | 60 | 1.5 | 9.1 |
| Comparative Example 1 | Chamfered | 0.4 | 0.6 | 59 | 1.4 | 9 |
| Comparative Example 2 | Chamfered | 0.9 | 1.1 | 61 | 1.5 | 9.3 |
| Comparative Example 3 | Not Chamfered | 0.4 | 0.8 | 59 | 1.5 | 9.2 |

|  | Carburizing Method | Thickness of Intergranular Oxidized Layer (μm) | Whether or Not Damage Has Been Found | Observation of Details | Carburizing Pulse Length (Ratio of Acetylene/N2) |
|---|---|---|---|---|---|
| Example 1 | Vacuum Carburizing | 0 | No Damage | — | 1:7 |
| Example 2 | Vacuum Carburizing | 0 | No Damage | — | 1:7 |
| Example 3 | Vacuum Carburizing | 0 | No Damage | — | 1:7 |
| Example 4 | Vacuum Carburizing | 0 | No Damage | — | 1:7 |
| Example 5 | Vacuum Carburizing | 0 | No Damage | — | 1:7 |
| Example 6 | Vacuum Carburizing | 0 | No Damage | — | 1:7 |
| Example 7 | Vacuum Carburizing | 0 | No Damage | — | 1:7 |

TABLE 1-continued

| | | | | | |
|---|---|---|---|---|---|
| Example 8 | Vacuum Carburizing | 0 | No Damage | Cracks | 1:7 |
| Example 9 | Vacuum Carburizing | 0 | No Damage | Cracks | 1:7 |
| Example 10 | Vacuum Carburizing | 0 | No Damage | Cracks | 1:7 |
| Example 11 | Vacuum Carburizing | 0 | No Damage | Cracks | 1:7 |
| Example 12 | Gas Carburizing | 23 | No Damage | Cracks | Gas Carburizing |
| Comparative Example 1 | Vacuum Carburizing | 0 | Damaged | Damaged at Oil Hole | 1:7 |
| Comparative Example 2 | Vacuum Carburizing | 0 | Damaged | Damaged at Oil Hole | 1:7 |
| Comparative Example 3 | Vacuum Carburizing | 0 | Damaged | Damaged at Oil Hole | 1:5 |

| | Number of Carburizing Pulses | Distance from Most Upstream Side of Workpiece-Quenching Gas Flow to Surface-Hardness Measurement Portion |
|---|---|---|
| Example 1 | 8 | 280 |
| Example 2 | 8 | 220 |
| Example 3 | 8 | 220 |
| Example 4 | 8 | 220 |
| Example 5 | 8 | 220 |
| Example 6 | 8 | 220 |
| Example 7 | 8 | 220 |
| Example 8 | 8 | 200 |
| Example 9 | 8 | 300 |
| Example 10 | 8 | 220 |
| Example 11 | 8 | 290 |
| Example 12 | 8 | 220 |
| Comparative Example 1 | 6 | 270 |
| Comparative Example 2 | 10 | 220 |
| Comparative Example 3 | 6 | 220 |

As is clear from Table 1, in all of Comparative Examples 1 to 3, the link members were damaged from their oil holes. Specifically, in Comparative Example 1, the carbon concentration of the parts other than the inclined surfaces is 0.4 wt %, the carbon concentration of the oil-hole parts is 0.6 wt %. In Comparative Example 2, the carbon concentration of the oil-hole parts is 1.1 wt %. In Comparative Example 3, the carbon concentration of the parts other than the inclined surfaces is 0.4 wt %.

In contrast, in none of Examples 1 to 7, damage to the link members and minute cracks in the oil holes were found. In Examples 8 to 12, minute cracks were found in the inclined surface of the oil holes. In more detail of Examples 8 to 12, in Example 8, the arithmetic mean roughness Ra of the inclined surfaces is 1.71 pn. In Example 9, the surface hardness of the inclined surfaces is 56 HR, and the arithmetic mean roughness Ra of the same is 1.8 μm. Note that, the cracks formed in Examples 8 to 12 are as significantly fine as not to be structurally influential and as not to impair product availability.

In addition, in Example 10, the maximum height Ry of the roughness of the inclined surfaces is 10 μm. In Example 11, the surface hardness of the same is 57. The intergranular oxidized layer was not found in any of Examples 1 to 11 and Comparative Examples 1 to 3, and was found only in Example 12 in which the gas carburizing was performed.

The above-described test results have demonstrated the following conditions (1) to (7) that are necessary for or suited to the link component with the oil hole according to the present invention.

(1) The oil holes have the inclined surface along their opening rims.
(2) The surface other than the oil holes has the carbon concentration of 0.5 wt % or more.
(3) The inclined surfaces have the carbon concentration within the range of 0.7 wt % or more and 0.9 wt % or less.
(4) The inclined surfaces have the arithmetic surface roughness Ra of 1.7 μm or less, and have the maximum height Ry of 9.8 μm or less.
(5) The inclined surfaces have the Rockwell hardness of 58 HRC or more.
(6) The intergranular oxidized layer on the surface around the oil holes has the thickness of 5 m or less.
(7) Performing the vacuum carburizing as the carburizing.

It has been found that, when at least the conditions (1) to (3) of the above-listed conditions (1) to (7) are satisfied, the link member according to the present invention can prevent the damage by increasing the resistance of the oil-hole parts on which the stress is liable to concentrate. In addition, as is clear from Comparative Examples 1 to 3, the damage occurred at the oil-hole parts if even one of the conditions (1) to (3) was not satisfied.

In addition, with regard to Examples 1 to 7 in which all the above-listed conditions (1) to (7) are satisfied, it has been found that the formation of the initial cracks in the inclined surfaces is reliably prevented, whereby the damage to the link members can be prevented, which can significantly contribute to an increase in durability of the variable-compression-ratio engine. In other words, an advantage of the above-listed conditions (1) to (7) for preventing the damage to the link component has been confirmed.

Details of the configuration of the link component with the oil hole according to the present invention are not limited to those in the embodiment and Examples described above, and appropriate changes may be made thereto within the gist of the present invention. In addition, as a matter of course, the link component with the oil hole is applicable not only to the link member of the intermediate link in the variable-compression-ratio engine, which is exemplified in each of the embodiments, but also to components of other internal-combustion engines.

REFERENCE SIGNS LIST

E Variable-compression-ratio engine (internal combustion engine)
150 Link member (link component)
150E Oil hole
150F Inclined surface
106 Crankshaft

The invention claimed is:

1. A linkage system, comprising: a linkage being an intermediate link split into a pair of link members, the link members each having an oil hole, the linkage being attached to a crankshaft of an internal combustion engine and the oil holes allowing communication from an outside to the crankshaft side, wherein the oil holes have an inclined surface along an opening rim on the crankshaft side, a surface other than the oil holes have a carbon concentration of 0.5 wt % or more, and the inclined surfaces have a carbon concentration within a range of 0.7 wt % or more and 0.9 wt % or less.

2. The linkage system according to claim 1, wherein the inclined surfaces have an arithmetic surface roughness Ra of 1.7 μm or less, and a maximum height Ry of 9.8 μm or less.

3. The linkage system according to claim 1, wherein the inclined surfaces have a Rockwell hardness of 58 HRC or more.

4. The linkage system according to claim 2, wherein the inclined surfaces have a Rockwell hardness of 58 HRC or more.

5. The linkage system according to claim 1, wherein the inclined surfaces have a surface on which an intergranular oxidized layer having a thickness of 5 μm or less is formed.

6. A method of producing the linkage system according to claim 1, the method comprising a step of performing carburizing the linkage, wherein the carburizing is vacuum carburizing.

7. A method of producing the linkage system according to claim 5, the method comprising a step of performing carburizing the linkage, wherein the carburizing is vacuum carburizing.

8. The linkage system according to claim 2, wherein the inclined surfaces have a surface on which an intergranular oxidized layer having a thickness of 5 μm or less is formed.

9. The linkage system according to claim 3, wherein the inclined surfaces have a surface on which an intergranular oxidized layer having a thickness of 5 μm or less is formed.

10. The linkage system according to claim 4, wherein the inclined surfaces have a surface on which an intergranular oxidized layer having a thickness of 5 μm or less is formed.

11. A linkage system, comprising: a linkage being part of an intermediate link split into a pair of link members, the link members each having an oil hole, the linkage being attached to a crankshaft of a variable compression ratio engine and the oil holes allowing communication from an outside to the crankshaft side, wherein the oil holes have an inclined surface along an opening rim on the crankshaft side, a surface other than the oil holes have a carbon concentration of 0.5 wt % or more, and the inclined surfaces have a carbon concentration within a range of 0.7 wt % or more and 0.9 wt % or less, wherein the linkage is vacuum carburized.

* * * * *